(12) United States Patent
Teknos et al.

(10) Patent No.: US 8,701,847 B2
(45) Date of Patent: Apr. 22, 2014

(54) VIBRATION DAMPER ASSEMBLY FOR A VEHICLE

(75) Inventors: Athanasios Konstantinos Teknos, Rochester Hills, MI (US); Chin Lim Vong, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 12/854,875

(22) Filed: Aug. 11, 2010

(65) Prior Publication Data

US 2011/0290607 A1 Dec. 1, 2011

Related U.S. Application Data

(60) Provisional application No. 61/348,039, filed on May 25, 2010.

(51) Int. Cl.
*F16F 7/10* (2006.01)

(52) U.S. Cl.
USPC .................. 188/379; 280/124.158; 224/42.21

(58) Field of Classification Search
USPC ......... 188/379, 378; 267/64.19, 64.21, 64.24, 267/64.27, 64.28; 280/6.15, 124.1, 280/124.112, 124.154, 124.158; 224/42.12, 224/42.21, 42.23, 42.26
See application file for complete search history.

(56) References Cited

U.S. PATENT DOCUMENTS

| | | | |
|---|---|---|---|
| 1,983,767 A | 12/1934 | Meuller | |
| 3,664,681 A * | 5/1972 | Thaxton | 280/124.116 |
| 3,904,093 A | 9/1975 | Hanela | |
| 3,952,894 A | 4/1976 | Mendez | |
| 4,377,366 A | 3/1983 | Hamlyn | |
| 4,411,159 A | 10/1983 | Spear et al. | |
| 4,492,506 A | 1/1985 | Hoagland et al. | |
| 4,623,165 A * | 11/1986 | Timmers | 280/86.5 |
| 4,718,693 A | 1/1988 | Booher | |
| 4,964,552 A * | 10/1990 | Terwilliger | 224/42.23 |
| 5,203,585 A * | 4/1993 | Pierce | 280/124.116 |
| 5,954,246 A | 9/1999 | Golovoy et al. | |
| 6,679,485 B2 * | 1/2004 | DeLizo et al. | 267/64.19 |
| 2001/0019196 A1 * | 9/2001 | Eckelberry | 280/149.2 |
| 2008/0203120 A1 | 8/2008 | McGuire et al. | |

FOREIGN PATENT DOCUMENTS

WO WO2006044943 4/2006

* cited by examiner

*Primary Examiner* — Pamela Rodriguez
(74) *Attorney, Agent, or Firm* — Raymond L. Coppiellie; Brooks Kushman P.C.

(57) ABSTRACT

The present disclosure relates to spare tire damper assemblies for a vehicle and methods for reducing vibration. The assemblies can include a support frame configured to secure a spare tire thereto and a first adjustable isolator positioned with respect to the support frame. A second isolator is positioned in series with the first isolator so that adjustment of the first isolator adjusts a static preload of the second isolator.

18 Claims, 7 Drawing Sheets

VIBRATION DAMPER ASSEMBLY FOR A VEHICLE

CROSS-REFERENCE TO RELATED APPLICATIONS

This application claims the benefit of U.S. Provisional Application No. 61/348,039 filed May 25, 2010, which is hereby incorporated by reference in its entirety.

TECHNICAL FIELD

The present disclosure relates generally to assemblies and methods for reducing vibration in a vehicle with the use of various mass dampers, e.g., a spare tire.

BACKGROUND

It is common practice to use a mass damper to improve the ride in a vehicle. Mass dampers are attached to the vehicle frame and tuned to resonate at a predetermined frequency in order to counter vehicle vibrations. Pick-up trucks tend to have higher sensitivity to vertical shake due to the lower resonance frequency of their frame and rear axle modes. Many pickup trucks exhibit uncomfortable vertical ride vibrations induced by road inputs. These high levels of vibration are induced by an interaction between the vehicle's first bending mode and rear axle hop mode. Conventionally, spare tire assemblies in trucks and SUVs are rigidly attached to the undercarriage of the vehicle. Some damper designs, however, include the use of an apparatus for mounting a spare tire to the vehicle in a manner to use the tire as a mass damper.

For example, PCT Application No.: WO 2006/044943 titled "Spare Tire Mass Damper" teaches the use of a damper assembly having torsional isolators. The spare tire is pivotally mounted with respect to the vehicle frame and the spare tire resonates about one end of the damper assembly. Damper assemblies that use springs, however, are limited in that the springs provide a constant stiffness, thus resulting in constant damper tuning frequency. The springs cannot be adjusted to increase or decrease the damper frequency when it is desirable to do so. Accordingly, the damper assembly cannot be adjusted or tuned to meet various vehicle demands such as, e.g., payload variations, varying wheelbase lengths, or rougher terrain.

Therefore, there is a need for a vibration damper assembly that has isolators with adjustable frequency and/or stiffness so that the vehicle can be tuned for different conditions.

SUMMARY

The present invention(s) may address one or more of the above-mentioned issues. Other features and/or advantages may become apparent from the description which follows.

One exemplary embodiment of the present invention relates to a spare tire damper assembly for a vehicle, including: a support frame configured to secure a spare tire thereto; a first isolator positioned with respect to the support frame. The first isolator is configured to adjust in at least one direction; and a second isolator in series with the first isolator so that adjustment of the first isolator adjusts a static preload of the second isolator.

Another exemplary embodiment of the present invention relates to a mass damper assembly for a vehicle, including: a mass; an attachment feature configured to secure the mass to the vehicle; a first isolator positioned with respect to the mass, configured to adjust in response to pneumatic controls; and a second isolator configured to be preloaded by adjustment of the first isolator.

Another exemplary embodiment of the present invention relates to a method of damping vehicle vibrations using a spare tire assembly, including: securing a support frame to a vehicle frame; positioning a first adjustable isolator with respect to the support frame; positioning a second isolator in series with the first adjustable isolator; preloading the second isolator by adjusting the height of the first isolator; and positioning a spare tire to vibrate with respect to the vehicle frame.

One advantage of the present teachings is that the damper assembly allows for the frequency of the damper to be adjusted quickly and easily through the air bladder inflation pressure. This allows the same damper to be compatible with trucks of different wheel bases or different first bending mode frequencies.

Another advantage of the present teachings is that the 4-point damper assembly allows for existing frame cross members to be utilized as attaching locations, thus minimizing the cost and complexity of the assembly (e.g., eliminating the need for additional mounting brackets or devises). The damper assembly can be adjusted accord to payload conditions.

Another advantage of the present teachings is that they provide a flexible vibration damper assembly that has isolators with adjustable height so that the vibration frequency of the spare tire can be tuned. The damper assembly can be altered to accommodate load variations, different vehicles, or rougher terrain.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same references numbers are used in the figures for identical or essentially identical elements. The above features and advantages and other features and advantages of the present invention are readily apparent from the following detailed description for carrying out the invention when taken in connection with the accompanying drawings. In the figures:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

The following description and adjoining figures pertain to exemplary tuned mass damper assemblies and methods for damping vehicle vibrations. The assemblies and methods incorporate the use of an existing vehicle mass as the assembly's tuned mass, e.g., a spare tire. The disclosure teaches spare tire damper assemblies that are attachable to the undercarriage of the vehicle. The damper assemblies serve to absorb incidental vibrations in the vehicle suspension and reduce vibration amplitudes at occupant positions. The mass of the spare tire along with the subframe to which the tire is attached, significantly reduces the amplitude of the first bending response by absorbing vibration when tuned to be coincident with the vehicle's first vertical bending. The damper assembly includes adjustable damping mechanisms so that the damper assembly can be tuned after assembly. Damping mechanism or vibration isolators are adjustable in the sense that their height and related qualities can be changed without removal or replacement. An additional vibration isolator is placed in series with the adjustable isolator and the added isolator is preloaded by the adjustable isolator. In this manner, the damper assemblies cannot only be tuned by the mass of the spare tire, position of the tire support frame and design of the support frame, but also by the adjustable stiffness of the isolators arranged in series.

The disclosed spare tire damper assemblies yield significant reductions in vehicle vibrations. Vehicle primary and secondary vibration (or shake and after shake) is driven largely by a modal alignment of the rear axle hop and overall vehicle bending. An exemplary rear axle frequency is 10.0 Hz and an exemplary overall vehicle bending frequency is 9.5 Hz. One spare tire damper assembly produces a 65% reduction in the vehicle/frame bending amplitude (in this instance the reduction is 9 dB to 11 dB). After shake ring down times were reduced by 16%. Rough shake was reduced by 33% and freeway hop amplitude was reduced by as much as 90%.

Figure 1:
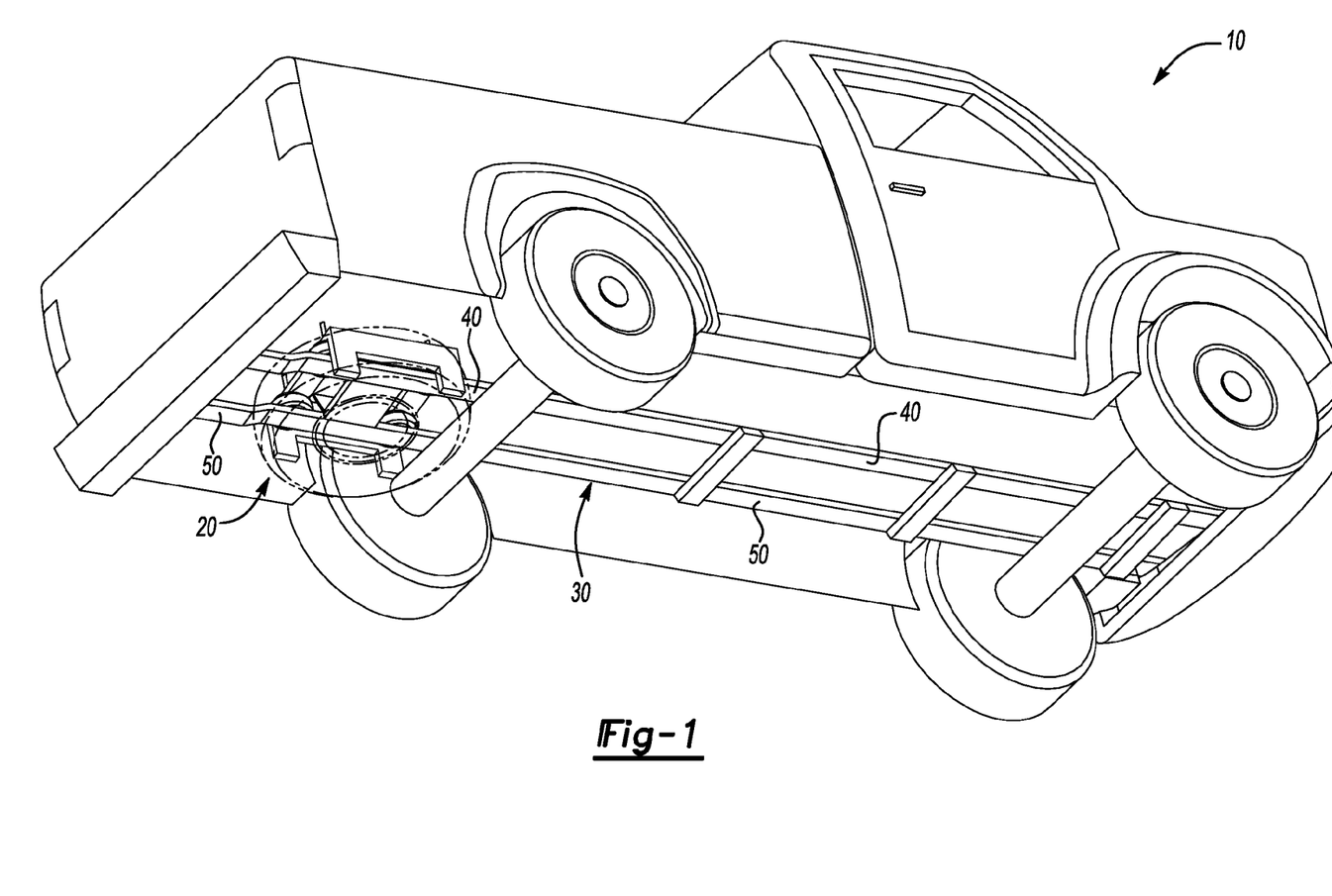
FIG. 1 is a perspective view of a vehicle with a spare tire damper assembly according to an exemplary embodiment.

Referring now to FIG. 1, there is shown therein a perspective view of a vehicle 10 having a spare tire damper assembly 20. The vehicle 10 is a pick-up truck. The truck 10 includes a vehicle main frame assembly 30 (as partially shown). The undercarriage or main frame 30 includes two longitudinally extending vehicle structural members 40, 50. The structural members 40, 50 are steel rails. Though the vehicle frame 30 is shown as a body-on-frame design, uni-body vehicle frames or other vehicle frames are compatible with the spare tire damper assembly 20.

Figure 2:
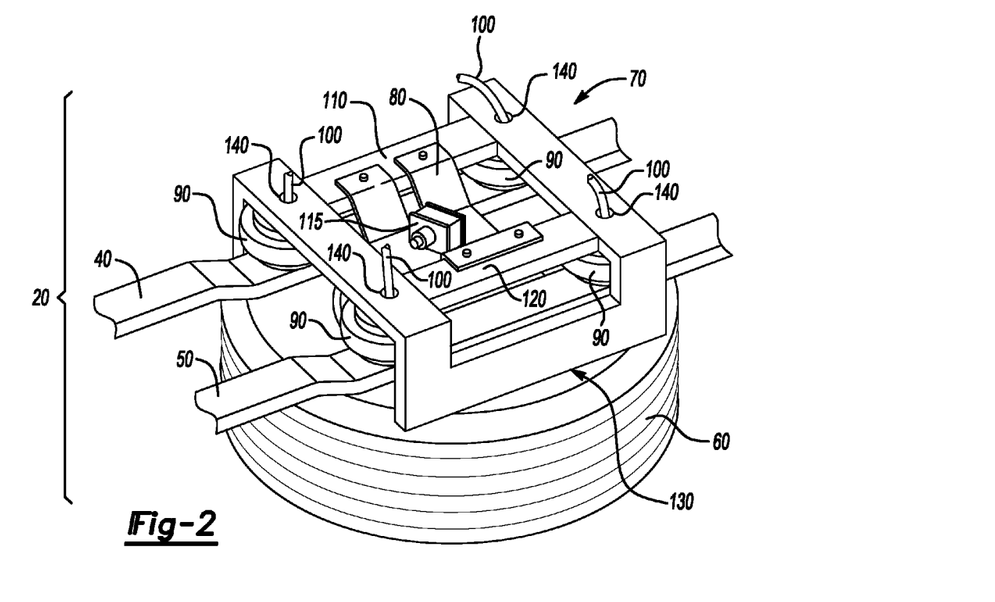
FIG. 2 is a perspective view of the spare tire damper assembly of FIG. 1.

The spare tire damper assembly 20 is attached to the vehicle main frame 30, as shown in FIG. 1. The damper assembly 20 is a tuned mass damper assembly having a tuned mass configured to vibrate with respect to the main vehicle frame 30. Damper assembly 20 uses the vehicle spare tire 60 as a damper mass. The tire 60 is a full-sized tire for use with the pick-up truck 10, weighing approximately 100 lbs. The tire 60 is secured to a support frame 70 through a winch (115 as shown in FIG. 2) which is mounted to bracket 80. The support frame 70 straddles the main frame rails 40 and 50 (or structural members). Between the frame rails 40, 50 and the support frame 70 are isolators 90. Isolators 90 are adjustable in that the volume and height of each isolator 90 can be varied. In this embodiment, each isolator 90 is a pneumatically or hydraulically controlled isolator. Hydraulic leads 100 are attachable to the isolators 90 to increase or decrease the fluid therein, thereby altering the isolator volume and height. Isolators 90 are adjustable in a vertical direction with respect to the vehicle. An exemplary pressure in the isolators can be filled to have an internal pressure of 50 psi. A target stiffness for the isolators is 10 lbf/in. The fluid pressure and stiffness can be lower or greater than 50 psi and 10 lbf/in, respectively. For example, in another embodiment, the pressure in the isolators is approximately 72 psi. A target frequency for the damper assembly 20 is 10 Hz. Damper assembly frequency is variable with bladder inflation. The spare tire assembly is discussed in more detail hereinbelow.

The damper assembly 20, as shown in FIG. 1, is positioned at the extreme rear of the truck. The spare tire is positioned aft of the rear axle on pickup trucks for accessibility and vehicle packaging reasons. Thus the use of the spare tire as a mass damper is optimal because of the weight of the tire and the location of the tire aft of the rear axle typically exhibiting very high bending amplitudes. These two factors can result in vibration damping with proper adjustment.

Referring now to FIG. 2, there is shown therein a perspective view of the spare tire damper assembly 20 of FIG. 1. The spare tire 60, as shown in FIG. 2, serves as an adequate example of an existing vehicle structure that can be incorporated into the damper assembly 20 to reduce vehicle vibration. The spare tire 60 is the preferred mass damper. In the illustrated embodiments, the spare tire is approximately 100 lbs. In other embodiments, the spare tire is larger or smaller than 100 lbs. A preferred weight is approximately 5% of the participating modal mass, which in this case is roughly 2000 lbs. The damper should then be 100 lbs which is roughly the weight of the spare tire and subframe. The use of the spare tire requires little to no additional mass to be added to the vehicle. In the illustrated embodiment, the spare tire subframe (e.g., 70) and bushings are added. The undercarriage is a beneficial position for the tuned mass damper because it is proximate to one of the vehicle's bending anti-nodes. The use of the damper assembly frame attenuates frame bending.

Figure 3:
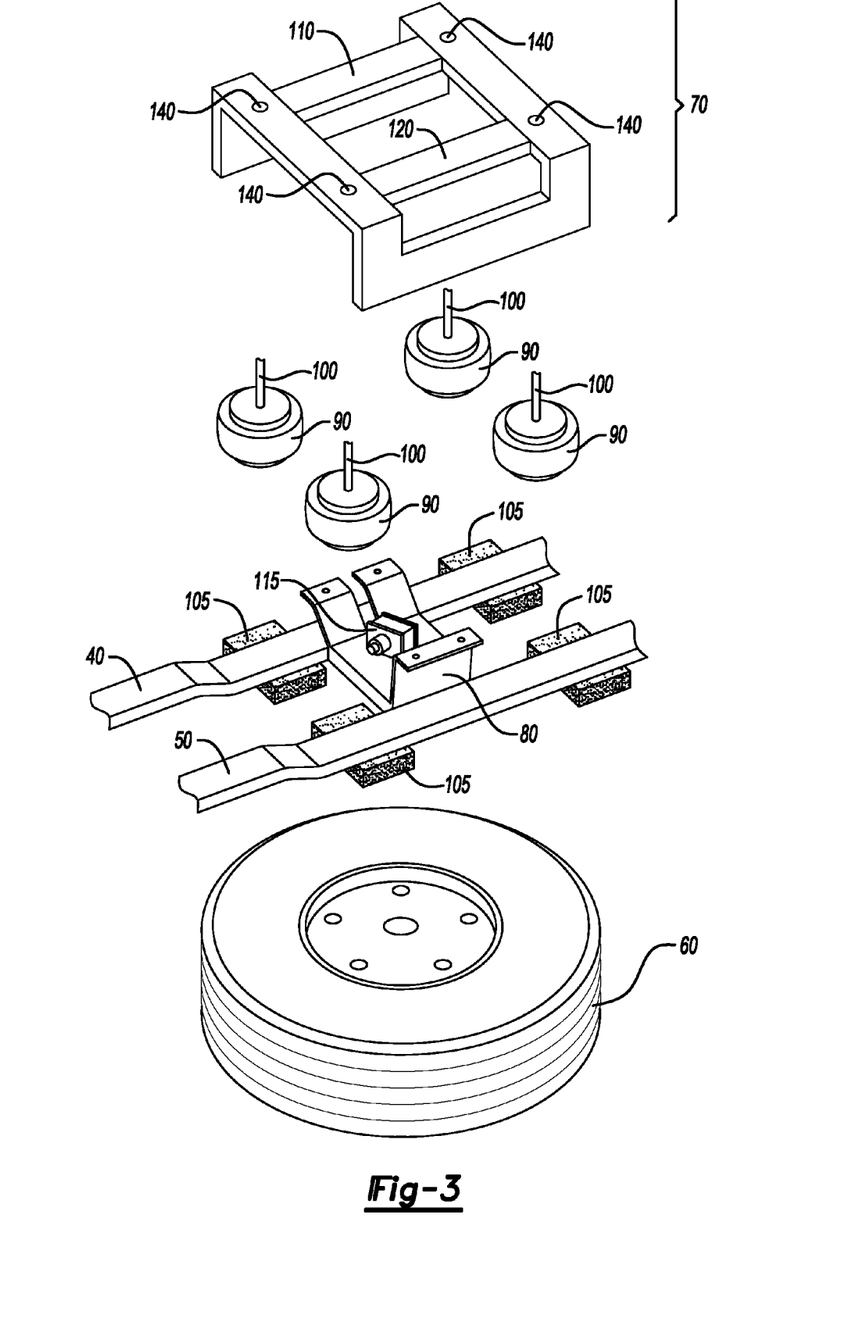
FIG. 3 is an exploded view of the spare tire damper assembly of FIG. 2.

FIGS. 2-3 shows the support frame 70 with spare tire 60 attached thereto. The tire 60 is attached to a U-shaped bracket 80 though winch 115. Winch 115 is an attachment feature configured to secure the mass to the vehicle. Bracket 80 is affixed to two rails 110, 120 of the support frame 70. The support frame 70 is a four-point, open-ended frame. Support frame 70 is open on its bottom side. The frame 70 is configured to straddle the vehicle main frame 30 at end 130. Support frame 70 includes a plurality of apertures 140 in the rails 110, 120. Hydraulic leads 100 are laced through the frame 70 and connected to each of the isolators 90.

Isolators 90 are air bladders, as shown in FIG. 3. Air is fed into each isolator 90 through a pump (not shown). The more fluid in the isolators 90 the stiffer the bladders become, the taller the bladders extend and the damper assembly vibrates at a higher frequency. Isolators 90 can have the same or different heights with respect to other isolators. In other embodiments, isolators 90 are hydraulic struts. The damper assembly 20, shown in FIGS. 2-3, is an overhead design. Isolators 90 are positioned atop (or above) the spare tire 60, between the support frame 70 and vehicle frame 30. This arrangement can generate a different vibration frequency than arrangements where isolators 90 are positioned underneath the spare tire 60 (e.g., as discussed with respect to FIG. 6).

Subframe 70, as shown in FIGS. 2-3, can be composed of a number of different materials. For example, subframe 70 can be composed of aluminum, an aluminum alloy, titanium, a steel or a polymer. The illustrated subframe 70 is formed from extruded aluminum members. The members are welded together. In other embodiments, the subframe can be, e.g., molded, stamped, machined or assembled using separate fasteners.

As shown in FIGS. 2-3, the tire 60 and subframe 70 are suspended with air bladders 90 and foam members or blocks 105 off of the main truck frame (as partially shown through rails 40 and 50). Foam blocks 105 act as supplemental isolators. Foam blocks 105 are positioned on the underside of the frame which are in constant contact with the spare tire 60. As the spare 60 is raised the foam block pre-load is increased, the suspension stiffness increases and damper assembly 20 vertical bounce frequency increases. The reverse is true when the adjustable isolators 90 are deflated. This adjustability has utility as it allows for the damper to be adjusted as the vehicle bending mode changes such as when the payload is increased. Four foam blocks are inserted in the spare tire damper assembly 20 between frame rails 40 and 50 and the spare tire 60. An exemplary stiffness for the foam blocks is 2 lbf/in.

Figure 4:
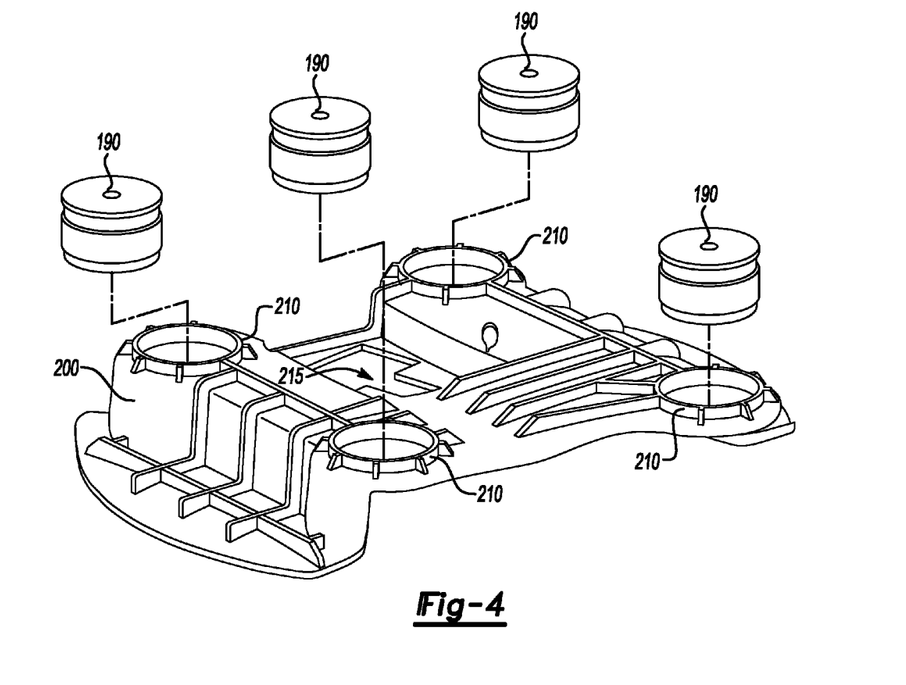
FIG. 4 is a perspective view of a spare tire damper assembly according to another exemplary embodiment.

Referring now to FIG. 4, there is shown therein a subframe 200 for use with another spare tire damper assembly according to a second example. Subframe 200 is designed to straddle the vehicle's main frame rails. In this embodiment, the subframe 200 includes a series of elastomeric bushings 190 that act as isolators in the assembly. The bushings 190 are configured to fit in orifices 210. The shown embodiment, is a four-bushing mounting. Bushings 190 are shear style bushings. The arrangement, shown in FIG. 4, is an overhead design. Bushings are configured to be positioned atop a spare tire. A winch secures the tire to the subframe 200 through orifice 215.

Subframe 200 can be attached to a vehicle main frame (e.g., 30 as shown in FIG. 1). The frame 200 utilizes existing box section frame cross members for mounting to the vehicle frame. The damper assembly is a tuned mass damper assembly having a tuned mass (e.g., the vehicle spare tire) configured to vibrate with respect to the vehicle frame.

A tire is secured to a winch that is connected to a spare tire through orifice 215 in the support frame 200 of FIG. 4. The support frame 200 attaches to the main frame rails. Between the frame rails and the support frame are the elastomeric bushings 190. A target stiffness for the elastomeric bushings 190 is 10 lbf/in.

Subframe 200, as shown in FIG. 4, can be composed of a number of different materials. For example, subframe 200 can be composed of aluminum, an aluminum alloy, steel, titanium or a polymer. The illustrated subframe 200 is casted. The subframe 200 can also be formed via die casting using powder metallurgy techniques.

Figure 5:
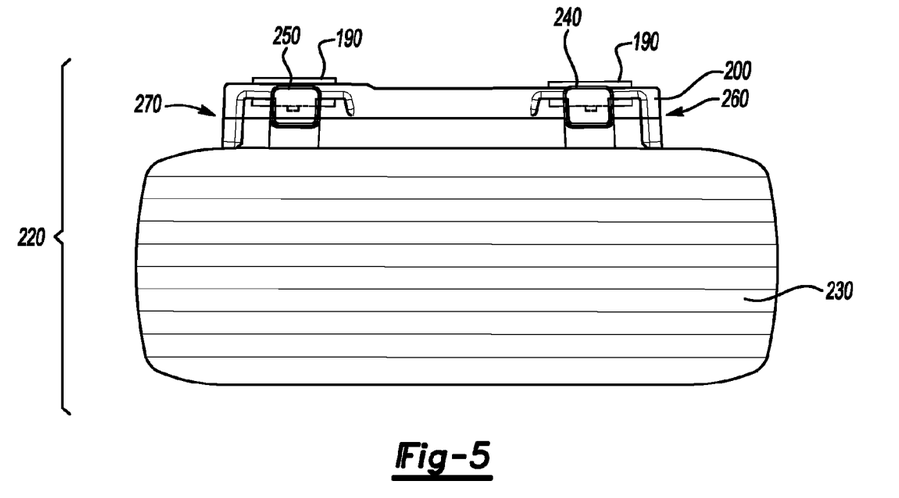
FIG. 5 is a side view of the spare tire damper assembly of FIG. 4.

FIG. 5 illustrates a side view of a damper assembly 220 having subframe 200. The assembly 220 includes a spare tire 230 attached to subframe 200 through a winch (not shown). Subframe 200 straddles two vehicle frame rails 240, 250. Bushings 190 are secured atop each rail 240, 250. As shown, the tire 230 is vibrating with respect to frame rails 240, 250. In this embodiment, bushings 190 are at each end 260, 270 of the subframe 200.

Figure 6:
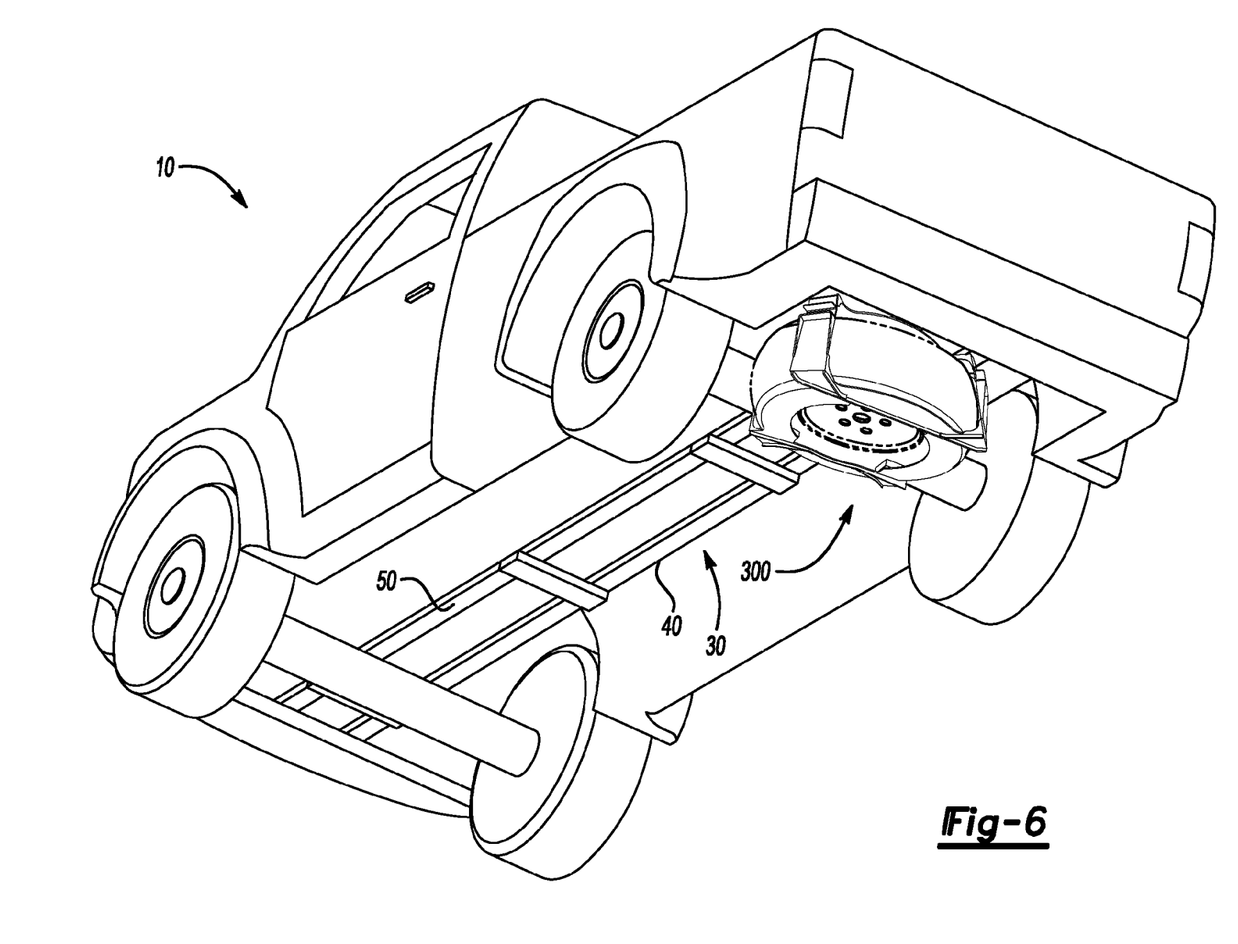
FIG. 6 is a perspective view of a vehicle with a spare tire damper assembly according to another exemplary embodiment.
Figure 7:
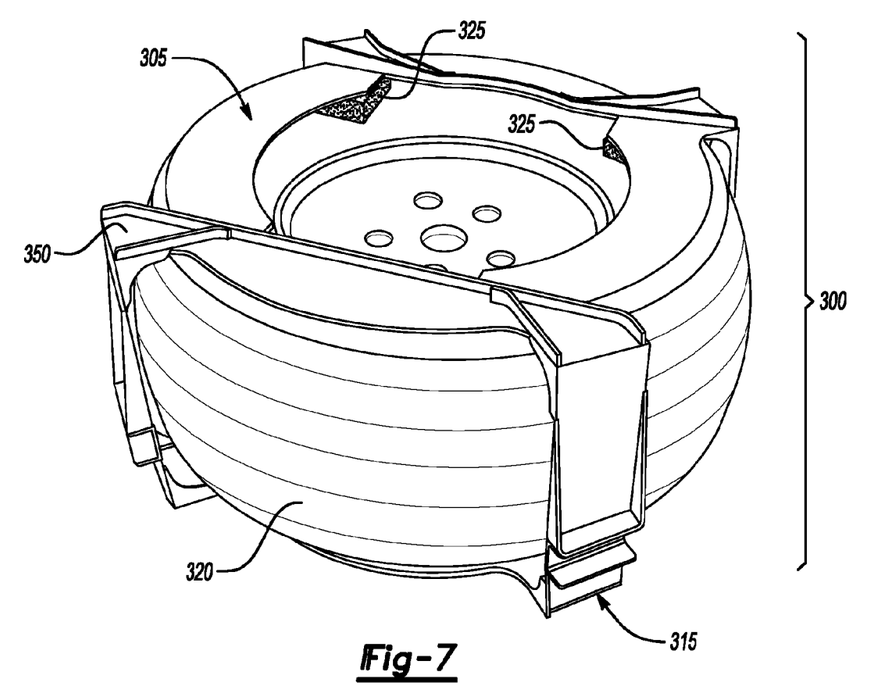
FIG. 7 is a perspective view of a spare tire damper assembly according to another exemplary embodiment.
Figure 8:
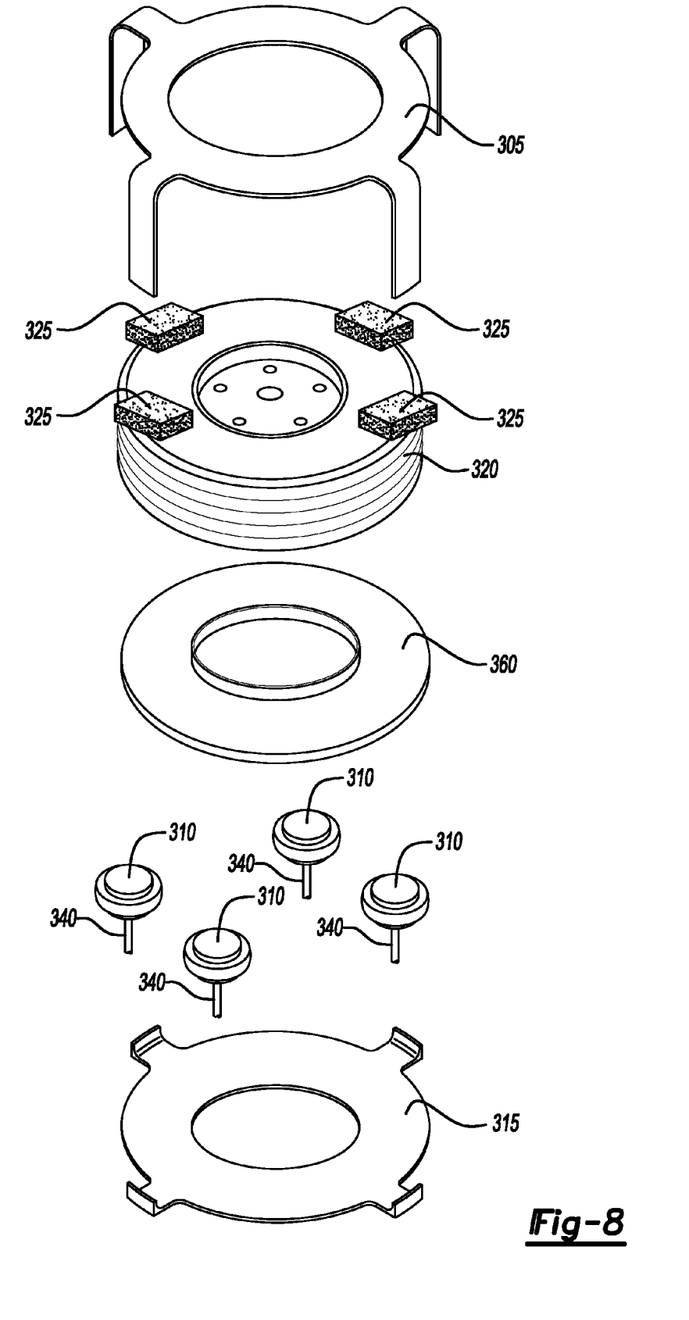
FIG. 8 is an exploded view of the spare tire damper assembly of FIG. 6.

Now with reference to FIGS. 6-8, there is shown an underslung spare tire damper assembly 300. The under-slung damper assembly 300 allows for quicker installation and no vehicle modification. Isolators 310 are positioned between the support frame 300 and a spare tire 320, underneath or on the bottom of the spare tire 320. This arrangement generates a different vibration frequency than arrangements where isolators are positioned atop the spare tire (e.g., as discussed with respect to FIGS. 2-3).

The spare tire damper assembly 300 (of FIG. 6) can be releasably attached to the vehicle main frame, e.g., 30 as shown in FIG. 6. Damper assembly can be detached from the vehicle main frame without deconstruction of the assembly 300. Damper assembly 300 sits underneath the vehicle main frame 30 and attaches thereto. The damper assembly 300 is a tuned damper assembly having a tuned mass configured to vibrate with respect to the vehicle frame 30. Damper assembly uses the vehicle spare tire 320 as a damper mass. Isolators 310 are vertically adjustable. Each isolator 310 is a pneumatically or hydraulically controlled isolator. Hydraulic leads 340 are attachable to the isolators 310. An exemplary pressure in the isolators 310 can be 70 psi. A target stiffness for the isolators 310 is 15 lbf/in.

The damper assembly subframe 300 includes a subframe 350 (or attachment feature) that attaches to the vehicle frame. The subframe 350 includes a top portion 305 and bottom portion 315. At the base of the support frame 300 is a plate 360. Isolators 310 are incorporated between plate 360 and the bottom portion 315 of the subframe 350. FIG. 6 shows the support frame 300 with spare tire 320 attached thereto. The subframe 350 is a four-point frame. Hydraulic leads 340 are laced through the frame and connected to each of the isolators 310.

Isolators 310 are air bladders, as shown in FIG. 6. Air is fed into each isolator 310 through a pump (not shown). The illustrated subframe 300 is formed from stamped steel welded together to form the subframe 350. In other embodiments, the subframe is molded, stamped, machined or assembled using separate fasteners.

As shown in FIG. 6, the tire 320 and subframe 350 are suspended with air bladders (e.g., isolators 310) above the spare tire 320. Foam blocks 325 are arranged in series with isolators 310 and incorporated between the top portion 305 of the subframe 350 and the spare tire. An exemplary stiffness for the foam blocks is 2 lbf/in. Foam blocks 325 are preloaded by the adjustment of isolators 310. The frame 350 can be formed, for example, via stamping, casting, molding or welding. In one version of the method, positioning the spare tire to vibrate with respect to the adjustable isolator includes placing the tire atop the adjustable isolator.

Figure 9:
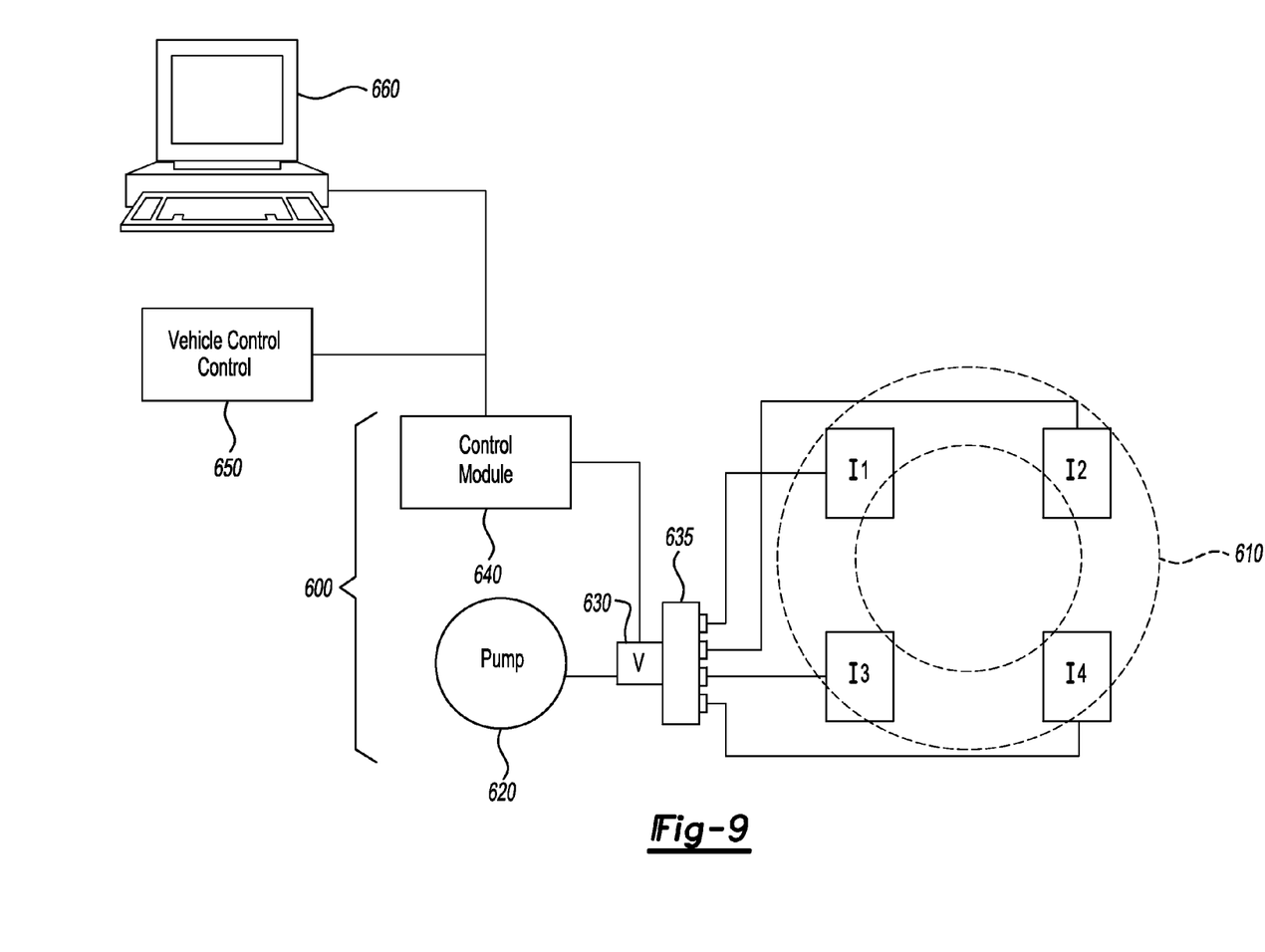
FIG. 9 illustrates an exemplary damper assembly with control module.

FIG. 9 illustrates another exemplary spare tire damper assembly 600. The damper assembly 600 is configured to automatically adjust the stiffness in any one of the isolators (I1, I2, I3 or I4) when a predetermined condition is met. In this manner, vibration absorption can be optimized under different driving conditions. Damper assembly 600 includes four hydraulic isolators (I1, I2, I3 or I4) positioned with respect to the spare tire 610. The stiffness is adjusted on each isolator by the use of a pump 620. A control valve 630 is in fluid communication with the pump 620 and a manifold 635. The manifold 635 distributes pressure to each isolator (I1, I2, I3 or I4). Control valve 630 is governed by a control module 640 linked to the valve. Control valve 630 can be, for example, any sort of electromechanical valve. Pump 620 is configured to selectively provide fluid to and remove fluid from each isolator (I1, I2, I3 or I4).

Control module 640, as shown in FIG. 9, is configured to automatically control the distribution of fluid in each isolator (I1, I2, I3 or I4) according to at least one predetermined condition. Control module 640 includes an electronic processor. The processor is configured to control solenoids in control valve 630 that can increase or decrease the pressure in each isolator under predetermined conditions. For example, when the vehicle payload is above a certain weight the stiffness in each isolator can be reduced. When the vehicle includes at least 500 lbs in the truck bed, the stiffness in each isolator is reduced by 10% (from 15 lbf/in to 13.5 lbf/in). Control module 640 is further configured to adjust the fluid distributed to each isolator according to climate conditions. Control module 640 is linked to an ambient temperature sensor. Where the ambient temperature is above 70 degrees Fahrenheit more fluid is included in each isolator (I1, I2, I3 or I4) and when the ambient temperature is less than 35 degrees Fahrenheit less fluid is included in each isolator. Control module 640 is linked to the vehicle control module 650 and is configured to receive data related to other vehicle conditions and adjust isolator stiffness accordingly. For example, a vehicle speed sensor is linked to control module 640 through the vehicle's main control module 650. Where the vehicle is operating above a predetermined speed, control module 640 is configured to reduce the stiffness in isolators by removing fluid therefrom.

Control module 640, as shown in FIG. 9, is further linked to a user interface 660. User interface 660 is an interactive display that enables the vehicle driver to control the stiffness of the damper assembly 600. Control module 640 is configured with different modes of operation. Each mode has different settings for the isolators (I1, I2, I3 or I4) in the assembly 600. One mode of operation is titled "Off-Road" and can be selected in anticipation of travel on rougher terrain. In off-road mode the stiffness in each isolator can be increased to change the damper assembly's characteristics during operation. Other modes can include, for example, an "on/off" mode that selectively enables and disables the damper assembly 600. While control module 640 is shown linked to the control valve 630, control module can be incorporated into the control valve. Wireless or hardwired connections can enable communication between any of the control valve 630, control module 640 and other vehicle controllers (e.g., vehicle control module 650 or user interface 660).

A method of damping vehicle vibrations using a spare tire assembly is disclosed herein. The method includes: securing a support frame to a vehicle frame; positioning a first adjustable isolator with respect to the support frame; positioning a second isolator in series with the first adjustable isolator; preloading the second isolator by adjusting the height of the first isolator; and positioning a spare tire to vibrate with respect to the vehicle frame. An exemplary spare tire damper assembly 20 is discussed with respect to FIGS. 2-3. The support frame can be secured to the vehicle frame via fasteners, clamps or welds. Adjustable isolators are included in the assembly (e.g., air bladders 90 as discussed with respect to FIGS. 2-3). The method can include adjusting the height of the isolator hydraulically. Fluid can be added or removed from the isolators to control the vertical position.

One embodiment, of the method includes pneumatically controlling the first isolator. An exemplary configuration is shown with respect to FIG. 2. In another version of the method, positioning the spare tire to vibrate with respect to the adjustable isolator includes placing the tire above the adjustable isolator. An exemplary configuration is shown with respect to FIGS. 6-8. In another version of the method, positioning the spare tire to vibrate with respect to the adjustable isolator includes placing the tire underneath the adjustable isolator. An exemplary configuration is shown with respect to FIGS. 1-3. A control module can also be provided, as taught with respect to FIG. 9. The control module is configured to automatically adjust the first isolator when a predetermined condition is met.

It should be understood that the method steps can be performed in different orders. Moreover, some or all of the steps of the methods can be automated. For example, the adjustment of isolator frequency and stiffness can be manually or automatically performed.

The present teachings are not limited to using the spare tire as a mass damper. Other existing or non-existing vehicle masses can be used with the present teachings such as, for example, the fuel pan or exhaust system components.

It will be apparent to those skilled in the art that various modifications and variations can be made to the methodologies of the present disclosure without departing from the scope of its teachings. Other embodiments of the invention will be apparent to those skilled in the art from consideration of the specification and practice of the teachings disclosed herein. It is intended that the specification and examples be considered as exemplary only.

Those familiar with the art to which this invention relates will recognize various alternative designs and embodiments for practicing the invention within the scope of the appended claims.

We claim:

1. A damper assembly for attaching a spare tire to a vehicle, comprising:
   a support frame securing the spare tire to a vehicle frame;
   a first isolator engaging the support frame and the vehicle frame, wherein the first isolator has selectively adjustable stiffness; and
   a second isolator being compressed between the spare tire and the vehicle frame, wherein adjusting the stiffness of the first isolator changes the extent that the second isolator is compressed and adjusts a static preload of the second isolator.

2. The assembly of claim 1, wherein the first isolator is a pneumatic isolator.

3. The assembly of claim 2, wherein the second isolator includes a foam member.

4. The assembly of claim 1, wherein the support frame includes a top portion and a bottom portion that encase the spare tire; and wherein the support frame is configured to rigidly attach to a vehicle frame.

5. The assembly of claim 4, wherein the first isolator is positioned between the support frame and the spare tire.

6. The assembly of claim 5, wherein the second isolator is positioned between the spare tire and the vehicle frame.

7. The assembly of claim 4, wherein the support frame is releasably attached to the vehicle frame.

8. The spare tire damper assembly of claim 1, further comprising:
   a fluid line attached to the first isolator to selectively deliver fluid to the first isolator.

9. The spare tire damper assembly of claim 8, further comprising:
   a controller programmed to deliver fluid to the first isolator via the fluid line based upon a payload of the vehicle.

10. The spare tire damper assembly of claim 8, further comprising:
    a user interface within the vehicle, and a controller programmed to deliver fluid to the first isolator via the fluid line based upon user input at the user interface.

11. The spare tire damper assembly of claim 8, further comprising:
    a controller programmed to deliver fluid to the first isolator via the fluid line based upon ambient climate conditions.

12. The spare tire damper assembly of claim 1, wherein the vehicle frame includes opposing first and second surfaces, and wherein the first surface engages the first adjustable isolator and the second surface engages the second isolator.

13. A spare tire mass damper assembly for a vehicle, comprising:
- an attachment bracket securing a spare tire to a frame rail of the vehicle;
- an adjustable isolator disposed between the attachment bracket and the frame rail, wherein the adjustable isolator is selectively adjusted between a minimum level of stiffness and a maximum level of stiffness by changing pneumatic pressure within the adjustable isolator; and
- a foam isolator engaging the spare tire and the frame rail, wherein the foam isolator is preloaded by adjusting the first isolator.

14. The assembly of claim 13, wherein the adjustable isolator is an air bladder.

15. A method of damping vehicle vibrations using a spare tire damper assembly, comprising:
- securing a support frame to a vehicle frame for securing a spare tire to the vehicle;
- assembling a first adjustable isolator between the support frame and the vehicle frame;
- assembling a second isolator between and in engagement with both the vehicle frame and the spare tire; and
- selectively adjusting the first adjustable isolator between a first stiffness and a second stiffness.

16. The method of claim 15, further comprising:
adjusting the height of the first isolator.

17. The method of claim 16, wherein the selectively adjusting of the first isolator includes pneumatically controlling the first adjustable isolator.

18. The method of claim 15, further comprising:
providing a control module configured to automatically adjust the first isolator when a predetermined condition is met.

* * * * *